Figure 3:
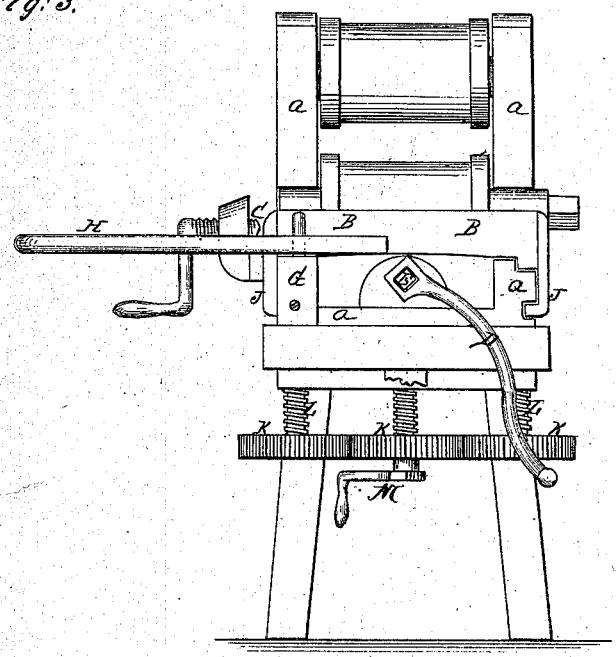

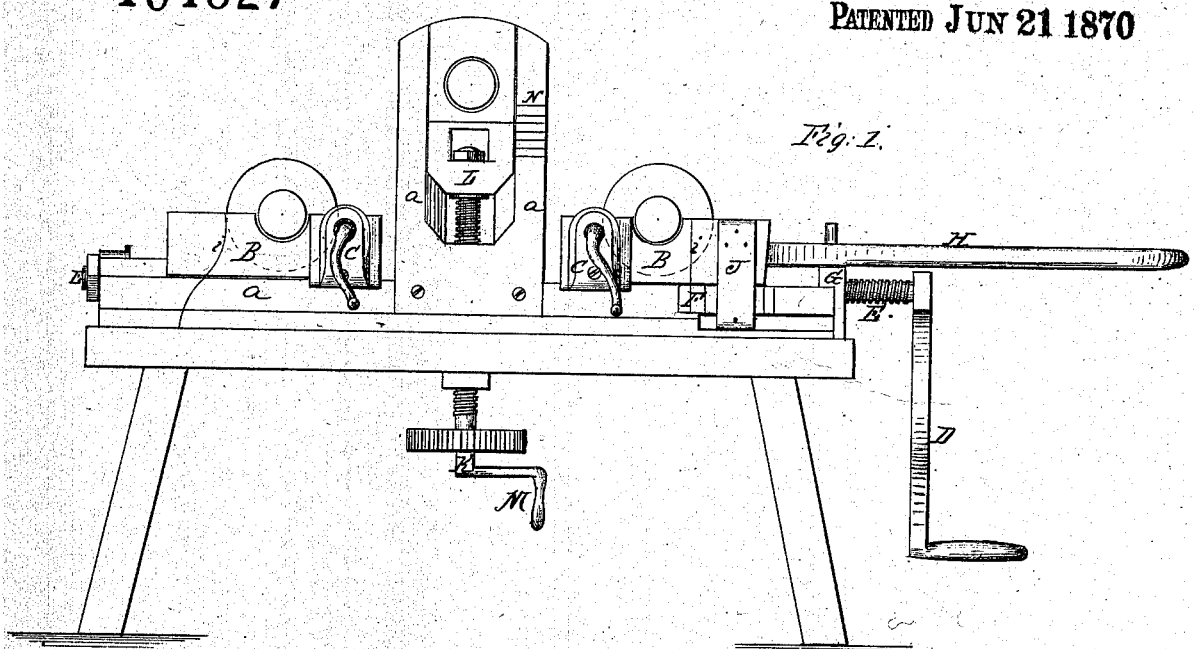
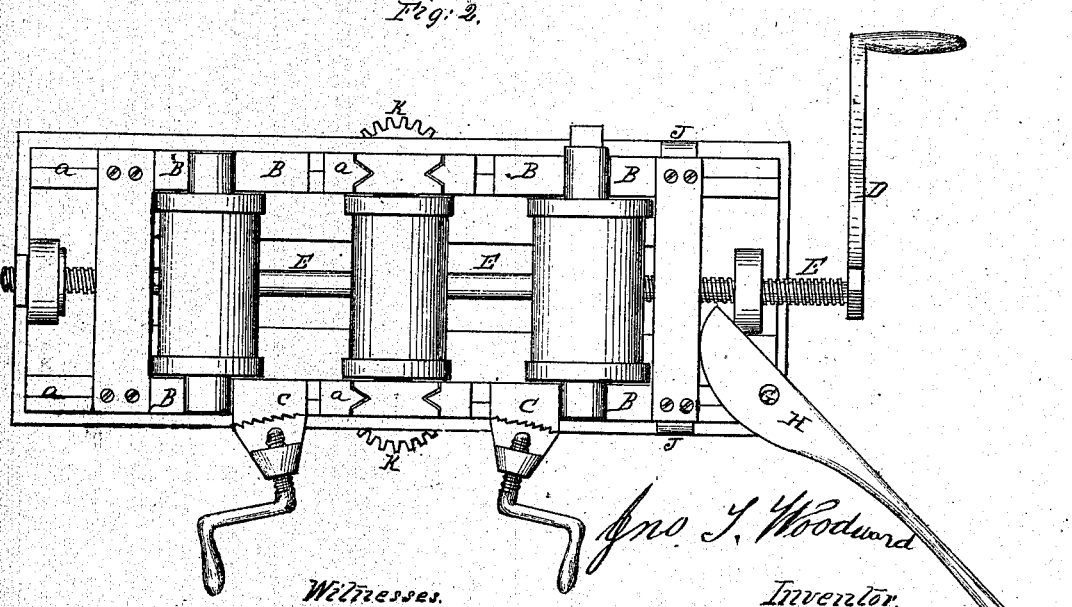

104527

United States Patent Office.

JOHN T. WOODWARD, OF BOWLING GREEN, KENTUCKY.

Letters Patent No. 104,527, dated June 21, 1870.

IMPROVED APPARATUS FOR BENDING AND UPSETTING TIRE.

The Schedule referred to in these Letters Patent and making part of the same.

To all whom it may concern:

Be it known that I, JOHN T. WOODWARD, of Bowling Green, county of Warren and State of Kentucky, have invented a new and useful Improvement in Machines for Bending and Upsetting Tires; and I do hereby declare that the following is a full, clear, and exact description thereof, reference being had to the accompanying drawing, in which—

Figure 1 is a side elevation;
Figure 2, a plan view; and
Figure 3 an end elevation.

A A A is the body of the machine, something similar to all tire-benders, except the grooves on top.

B B are two slides, which can be rapidly moved backward or forward, as occasion may require, either in bending or upsetting, by means of the crank D and rod E.

C C are two jaws attached to the slides, on the inside of which are teeth.

The tire is firmly pressed against these by two cranks, in upsetting, and then, by means of the crank D, (or a wheel,) the slides are forced together, thus compelling the tire to upset with ease and accuracy, the exact distance you upset it being measured by the gauge F.

K K K are cog-wheels, the two outside ones being attached to the rods and slides L L, and, the center wheel being turned by the crank M, you are enabled to raise or lower the central roller with great ease and rapidity, and, by means of the gauge N, can be set to bend tire of any given height, thereby making it a perfect tire-bender.

The two slides B B should be against the center-piece in setting the machine to bend tire.

Having thus fully described my invention,

What I claim, and desire to secure by Letters Patent, is—

1. The combination of the vertically-adjustable roller, with the two side rollers, the slides B, and right-and-left screw E, arranged and operating as a tire-bending machine, substantially as described.

2. The combination of the right and left-hand screw E, slides B, upright A A, serrated jaws C C, and screws with crank extensions for clamping the tire, arrranged and operating as tire-upsetting machine, substantially as described.

3. The combination of the cog-wheels K K K, slides L, and gauge N, substantially as shown and described.

JNO. T. WOODWARD.

Witnesses:
WM. MCAULEY,
C. A. EVERHART.